United States Patent
Chen

(10) Patent No.: US 11,392,220 B2
(45) Date of Patent: Jul. 19, 2022

(54) BIDIRECTIONAL ACTIVE STYLUS AND SENSING SYSTEM

(71) Applicant: Silicon Integrated Systems Corp., Hsinchu (TW)

(72) Inventor: Han-ning Chen, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 0 days.

(21) Appl. No.: 16/531,067

(22) Filed: Aug. 4, 2019

(65) Prior Publication Data

US 2020/0042113 A1 Feb. 6, 2020

(30) Foreign Application Priority Data

Aug. 3, 2018 (TW) ................................. 107127159

(51) Int. Cl.
*G06F 3/0354* (2013.01)
*G06F 3/038* (2013.01)
*G06F 3/044* (2006.01)

(52) U.S. Cl.
CPC .......... *G06F 3/03545* (2013.01); *G06F 3/038* (2013.01); *G06F 3/03547* (2013.01); *G06F 3/0442* (2019.05)

(58) Field of Classification Search
CPC ............... G06F 3/03545; G06F 3/0442; G06F 3/03547; G06F 3/038
See application file for complete search history.

(56) References Cited

U.S. PATENT DOCUMENTS

| | | | |
|---|---|---|---|
| 10,025,401 B2 | 7/2018 | Bhandari et al. | |
| 10,055,036 B2 | 8/2018 | Koike et al. | |
| 10,241,597 B2 | 3/2019 | Jung et al. | |
| 10,331,235 B2 | 6/2019 | Fleck | |
| 2013/0106717 A1* | 5/2013 | Sundara-Rajan | G06F 3/03545 345/173 |
| 2015/0138164 A1* | 5/2015 | Hinson | G06F 3/0445 345/179 |
| 2016/0188016 A1 | 6/2016 | Munakata et al. | |
| 2016/0306447 A1 | 10/2016 | Fleck et al. | |
| 2017/0068337 A1* | 3/2017 | Bhandari | H01G 5/12 |
| 2017/0068339 A1 | 3/2017 | Zimmerman et al. | |
| 2017/0262071 A1* | 9/2017 | Chang | G06F 3/04186 |
| 2017/0357338 A1* | 12/2017 | Bell | G06F 3/0383 |
| 2018/0107293 A1* | 4/2018 | Yeh | B43K 29/08 |
| 2018/0143703 A1* | 5/2018 | Fleck | G06F 3/044 |
| 2020/0033965 A1 | 1/2020 | Bakken et al. | |

FOREIGN PATENT DOCUMENTS

| | | |
|---|---|---|
| CN | 107272921 A | 10/2017 |
| CN | 108027668 A | 5/2018 |
| TW | 201610763 A | 3/2016 |
| TW | 201702816 A | 1/2017 |
| TW | 201820085 A | 6/2018 |

\* cited by examiner

*Primary Examiner* — Chanh D Nguyen
*Assistant Examiner* — Benjamin Morales
(74) *Attorney, Agent, or Firm* — Mark M. Friedman

(57) ABSTRACT

A bidirectional active stylus and a sensing system are provided. The stylus includes a receiving electrode, a first emitting diode and a second emitting diode. The receiving electrode is configured to receive a synchronous signal from a touch pad. The receiving electrode is disposed at a position closer to the touch pad with respect to the first emitting diode and the second emitting diode. The strength of received signals is improved.

14 Claims, 6 Drawing Sheets

BIDIRECTIONAL ACTIVE STYLUS AND SENSING SYSTEM

BACKGROUND

1. Field of Disclosure

The present disclosure relates to sensing technologies, and more particularly to a bidirectional active stylus and a sensing system.

2. Description of Related Art

FIG. 1 is a diagram showing a conventional input output sensing system. The system includes a stylus 10, a touch pad 12 and a touch controller 14 connected to the touch pad 12. The stylus 10 includes a body 101, a cone portion 102 and a tip portion 103 that are connected sequentially. The stylus 10 is an active stylus. Also, the stylus 10 includes a plurality of electrodes used to receive and send signals. As shown in FIG. 1, the stylus 10 includes a first emitting (TX1) electrode 112 deployed at the tip portion 103, and a receiving (RX) electrode 111 and a second emitting (TX2) electrode 113 deployed at the cone portion 102 and located sequentially away from the first emitting electrode 112. Generally, the receiving electrode 111 is a ring electrode and the first emitting electrode 112 and the second emitting electrode 113 are metal electrodes. By signal transmission between the touch pad 12 and the electrodes 111, 112 and 113, the touch controller 14 can calculate the coordinate and tilt angle of the stylus 10.

Specifically, the touch pad 12 includes a plurality of driving lines (not shown) and a plurality of sensing lines (not shown) that are interlaced with each other. The touch pad 12 and the electrodes 111, 112 and 113 on the stylus 10 are capacitively coupled to each other. By sensing capacitance changes for each coordinate on the touch pad 12, the touch controller 14 can obtain the position of the stylus 10 and the tilt angle of the stylus 10 with respect to the touch pad 12.

In the conventional skills, the touch pad 12 emits a synchronous signal S0 and the receiving electrode 111 of the stylus 10 receives the synchronous signal S0. The first emitting electrode 112 and the second emitting electrode 113 emit signals by taking the synchronous signal S0 as a time reference. The first emitting electrode 112 on the stylus 10 is closer to the touch pad 12 than the second emitting electrode 113. Generally, the first emitting electrode 112 emits a first signal E1, which will cause capacitance changes on the touch pad 12. The touch controller 14 senses the capacitance changes for determining the coordinate of the stylus 10 on the touch pad 12. The second emitting electrode 113 emits a second signal E2, which will cause capacitance changes on the touch pad 12. The touch controller 14 senses the capacitance changes for determining the tilt angle of the stylus 10 with respect to the touch pad 12.

The conventional stylus 10 has the following drawbacks:
(1) The receiving electrode 111 of the stylus 10 is too far away from the touch pad 12. The synchronous signals emitted from the touch pad 12 and received by the receiving electrode 111 are small in amount and are easy to be interfered by noise signals.
(2) The receiving electrode 111 of the stylus 10 is disposed at the cone portion 102 where a finger contacts the stylus 10. The receiving electrode 11 is easy to be covered or interfered by the finger to cause a bad connection.
(3) The receiving electrode 111 of the stylus 10 and the touch pad 12 are separated by the first emitting electrode 112. The first emitting electrode 112 will absorb the synchronous signals emitted by the touch pad 12 so as to decrease an amount of the synchronous signals received by the receiving electrode 111.
(4) The receiving electrode 111, the first emitting electrode 112 and the second emitting electrode 113 of the stylus 10 are three independent components. This makes the assembling processes complicated. It is easy to have errors in the assembling or increase the possibility of short circuits.

Therefore, there is a need to provide a new solution to solve above problems.

SUMMARY

The objective of the present disclosure is to provide a bidirectional active stylus and a sensing system, for solving the problem of bad signal receiving performance by a receiving electrode.

To achieve above objective, an aspect of the present disclosure provides a bidirectional active pen, including: a body; a cone portion, having a bottom part and a top part, the bottom part of the cone portion having a cross-sectional area greater than that of the top part, the bottom part of the cone portion connecting to the body; and a tip portion, connected to the top part of the cone portion, wherein the tip portion includes: a receiving electrode, located at a distal end of the tip portion away from the cone portion, configured to receive a synchronous signal coming from outside of the stylus; a first emitting electrode, disposed at the tip portion at a position closer to the cone portion than the receiving electrode, configured to emit a first signal based on the synchronous signal received by the receiving electrode, the first signal provided to calculate a coordinate of the tip portion; and a second emitting electrode, disposed at the tip portion at a position far away from the receiving electrode with respect to the first emitting electrode, configured to emit a second signal based on the synchronous signal received by the receiving electrode, the second signal provided to calculate a tilt angle of the stylus.

According to an embodiment of the present disclosure, the first emitting electrode is disposed between the receiving electrode and the second emitting electrode.

According to an embodiment of the present disclosure, the receiving electrode, the first emitting electrode and the second emitting electrode of the tip portion are arranged along a straight line along a lengthwise direction of the stylus, and are spaced apart from each other on the straight line with overlap.

According to an embodiment of the present disclosure, the cone portion has a conductive portion at a position corresponding to the second emitting electrode, and the conductive portion of the cone portion and the second emitting electrode of the tip portion are electrically connected to each other.

According to an embodiment of the present disclosure, the first signal emitted by the first emitting electrode and the second signal emitted by the second emitting electrode are different in frequency but are emitted at the same time in response to the synchronous signal received by the receiving electrode.

According to an embodiment of the present disclosure, the first signal emitted by the first emitting electrode and the second signal emitted by the second emitting electrode are different in frequency and are emitted at different time points in response to the synchronous signal received by the receiving electrode.

According to an embodiment of the present disclosure, the first signal emitted by the first emitting electrode and the second signal emitted by the second emitting electrode have a same frequency but are emitted at different time points in response to the synchronous signal received by the receiving electrode.

According to an embodiment of the present disclosure, the cone portion has a slot formed inside, the slot has an opening formed at the top part, a part of the tip portion is received in the slot, another part of the tip portion exposes from the opening.

In another aspect of the present disclosure provides a bidirectional active pen, including: a body; a cone portion, having a bottom part and a top part, the bottom part of the cone portion having a cross-sectional area greater than that of the top part, the bottom part of the cone portion connecting to the body; and a tip portion, connected to the top part of the cone portion, wherein the tip portion includes: a receiving electrode, located at a distal end of the tip portion away from the cone portion, configured to receive a synchronous signal coming from outside of the stylus; and a first emitting electrode, disposed at the tip portion at a position closer to the cone portion than the receiving electrode, configured to emit a first signal based on the synchronous signal received by the receiving electrode, the first signal provided to calculate a coordinate of the tip portion, wherein the cone portion includes: a second emitting electrode, disposed at the cone portion at a position far away from the receiving electrode with respect to the first emitting electrode, configured to emit a second signal based on the synchronous signal received by the receiving electrode, the second signal provided to calculate a tilt angle of the stylus.

According to an embodiment of the present disclosure, the first emitting electrode is disposed between the receiving electrode and the second emitting electrode.

According to an embodiment of the present disclosure, the receiving electrode and the first emitting electrode of the tip portion and the second emitting electrode of the cone portion are arranged along a straight line along a lengthwise direction of the stylus, and are spaced apart from each other on the straight line with overlap.

According to an embodiment of the present disclosure, the first signal emitted by the first emitting electrode and the second signal emitted by the second emitting electrode are different in frequency but are emitted at the same time in response to the synchronous signal received by the receiving electrode.

According to an embodiment of the present disclosure, the first signal emitted by the first emitting electrode and the second signal emitted by the second emitting electrode are different in frequency and are emitted at different time points in response to the synchronous signal received by the receiving electrode.

According to an embodiment of the present disclosure, the first signal emitted by the first emitting electrode and the second signal emitted by the second emitting electrode have a same frequency but are emitted at different time points in response to the synchronous signal received by the receiving electrode.

According to an embodiment of the present disclosure, the cone portion has a slot formed inside, the slot has an opening formed at the top part, a part of the tip portion is received in the slot, another part of the tip portion exposes from the opening.

In still another aspect, the present disclosure provides a sensing system, including: a touch pad; and a bidirectional active stylus, movably contacting the touch pad, wherein the stylus includes: a body; a cone portion, having a bottom part and a top part, the bottom part of the cone portion having a cross-sectional area greater than that of the top part, the bottom part of the cone portion connecting to the body; and a tip portion, connected to the top part of the cone portion, wherein the tip portion includes: a receiving electrode, located at a distal end of the tip portion away from the cone portion, configured to receive a synchronous signal from touch pad; a first emitting electrode, disposed at the tip portion at a position closer to the cone portion than the receiving electrode, configured to emit a first signal based on the synchronous signal received by the receiving electrode, the touch pad sensing the first signal to obtain a coordinate of the tip portion of the stylus on the touch pad; and a second emitting electrode, disposed at the tip portion at a position far away from the receiving electrode with respect to the first emitting electrode, configured to emit a second signal based on the synchronous signal received by the receiving electrode, the touch pad sensing the second signal to obtain a tilt angle of the stylus with respect to the touch pad.

Compared to the conventional skills, the stylus of the present disclosure has the following advantages: (1) The receiving electrode of the stylus is close to the touch pad. The synchronous signals emitted from the touch pad and received by the receiving electrode are large in amount, are well received and are not easy to be interfered by noise signals. (2) The receiving electrode of the stylus is disposed at pen tip and thus will not be easy to be covered or interfered by a finger to cause a bad connection. (3) The first emitting electrode of the stylus is disposed above the receiving electrode. The first emitting electrode will not absorb the synchronous signal emitted by the touch pad and thus the quality of synchronous signal received by the receiving electrode is improved in a further step. (4) The receiving electrode, the first emitting electrode and the second emitting electrode of the stylus are integrated into an individual assembly such that the assembling is simple. It is not easy to have errors in the assembling or increase the possibility of short circuits.

| | | | |
|---|---|---|---|
| 10 | stylus | 12 | touch pad |
| 14 | touch controller | 20 | stylus |
| 22 | touch pad | 24 | touch controller |
| 71 | micro control unit | 72 | storage |
| 73 | power manage unit | 74 | RX analog front-end |
| 75 | RX decoder | 76 | first encoder |
| 77 | second encoder | 78 | analog-to-digital converter |
| 81 | battery | 82 | inertial measurement unit |
| 83 | pressure detector | 101 | body |
| 102 | cone portion | 103 | tip portion |
| 111 | receiving electrode | 112 | first emitting electrode |
| 113 | second emitting electrode | 200 | pen controller |
| 201 | body | 202 | cone portion |
| 203 | tip portion | 204 | tip cover |
| 211 | receiving electrode | 212 | first emitting electrode |
| 211 | second emitting electrode | 220 | conductive portion |
| 730 | voltage detector | A | enlargement |
| S0 | synchronous signal | E1 | first signal |
| E2 | second signal | | |

DETAILED DESCRIPTION OF PREFERRED EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure, and as used herein, the term "embodiment" refers to an instance, an example, or an illustration but is not intended to limit the present disclosure. In addition, the articles "a" and "an" as used in the specification and the appended claims should generally be construed to mean "one or more" unless specified otherwise or clear from the context to be directed to a singular form.

Figure 1:
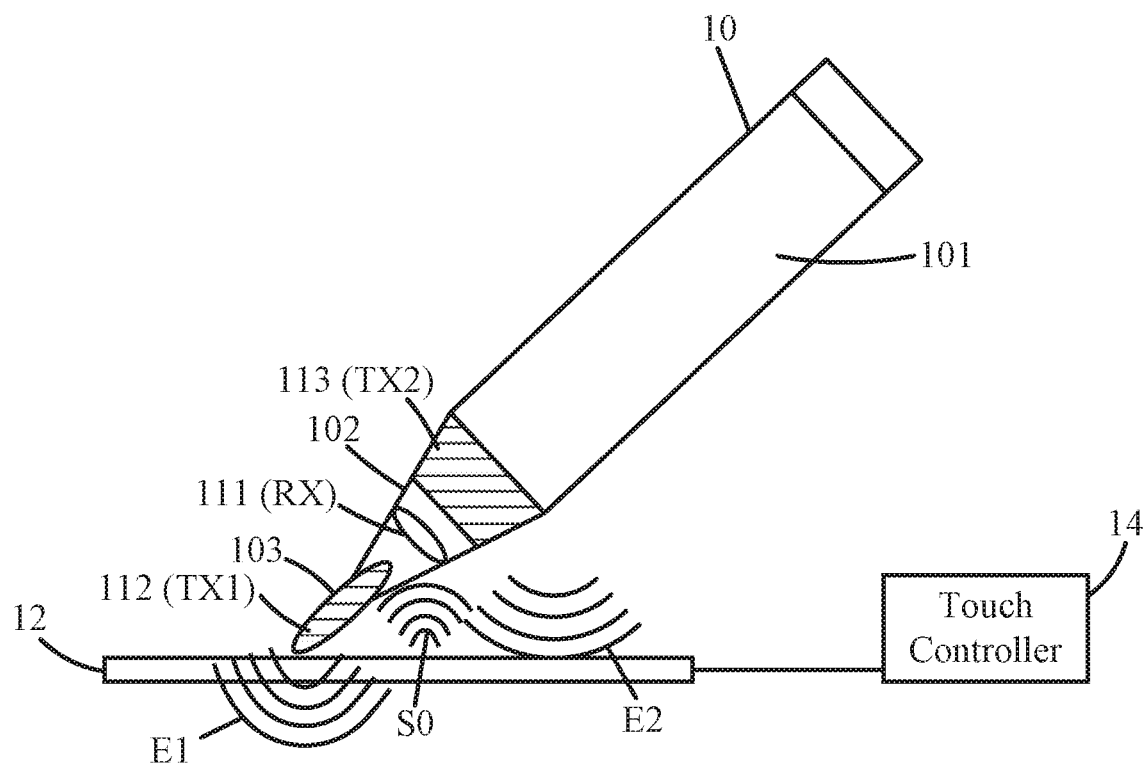
FIG. 1 is a diagram showing a conventional input output sensing system.
Figure 2:
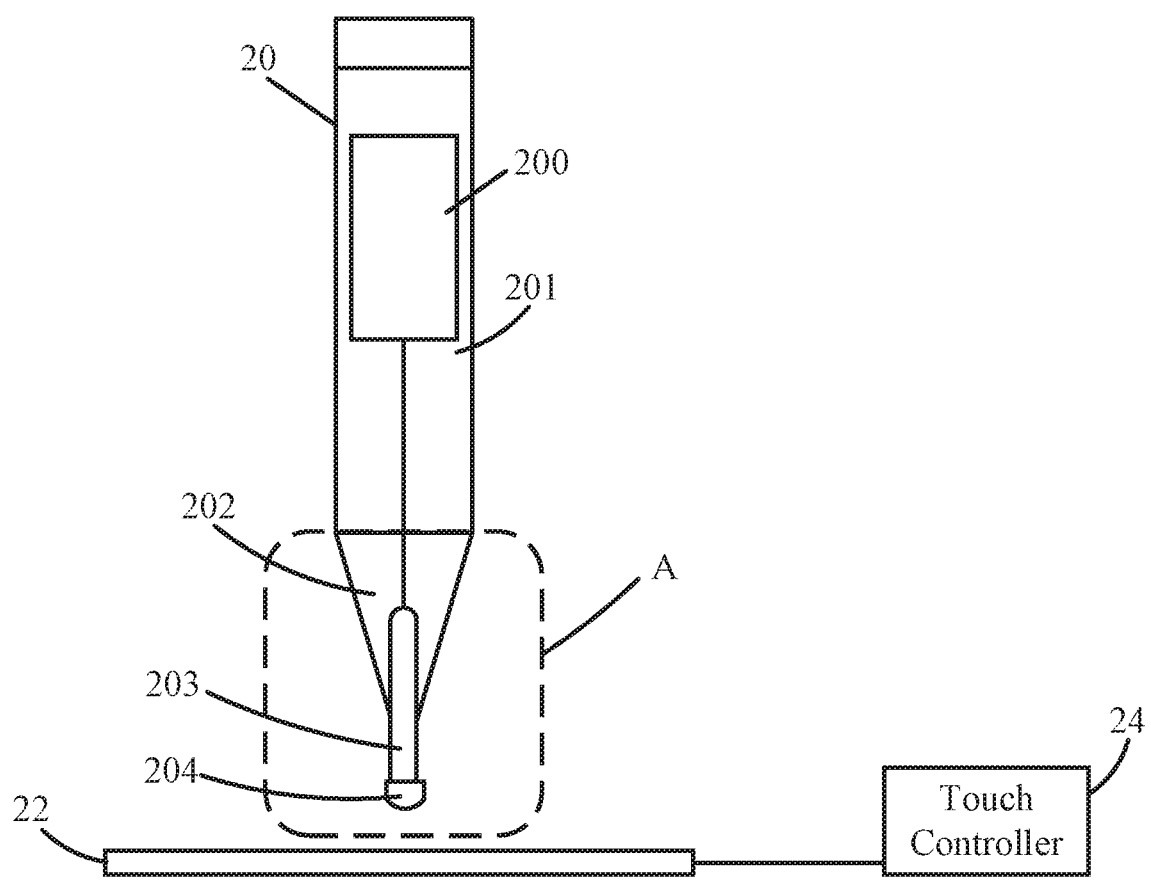
FIG. 2 is a diagram showing a sensing system in accordance with the present disclosure.

FIG. 2 is a diagram showing a sensing system in accordance with the present disclosure. The system includes a stylus 20, a touch pad 22 and a touch controller 24. The stylus 20 is an active stylus, that is, the stylus 20 itself has a power source and is driven by the power source to receive or emit signals. The touch pad (or called a touch panel) 22 can be a capacitive touch panel, which may be integrated with a display panel to have a display function. The stylus 20 is movable to contact the touch pad 22. That is, the stylus 20 and the touch pad 22 are two independent components; however, the stylus 20 can move on an external surface of the touch pad 22 to achieve a handwriting function or the like, for example. The touch controller 24 is electrically connected to the touch pad 22 and is configured to calculate the coordinate of a finger or a tip object (or the stylus 20) on the touch pad 22 when it touches the touch pad 22.

As shown in FIG. 2, the stylus 2 includes a body 201, a cone portion 202 and a tip portion 203. The cone portion 202 of the stylus 20 can be shaped as a cone. The cone portion 202 has a bottom part and a top part. The (cross-) sectional area of the bottom part of the cone portion 202 is greater than that of the top part. The body 201 is connected to the bottom part of the cone portion 202 and the tip portion 203 is connected to the top part of the cone portion 202. Specifically, the cone portion 202 has a slot formed inside. The slot has an opening formed at the top part. A part of the tip portion 203 is received in the slot. Another part of the tip portion 203 exposes from the opening.

In addition, the stylus 20 further includes a tip cover 204, which puts on a distal end of the tip portion 203. The material of the tip cover 204 can be rubber or plastic. The tip cover 204 can improve comfortable writing on the touch pad 22. The tip cover 204 is replaceable. Different tip covers 204 can be used to get different handwriting experiences. In addition, the stylus 20 further includes a pen controller 200 disposed inside the stylus 20. The pen controller 200 is an internal circuit of the stylus 20.

Figure 3:
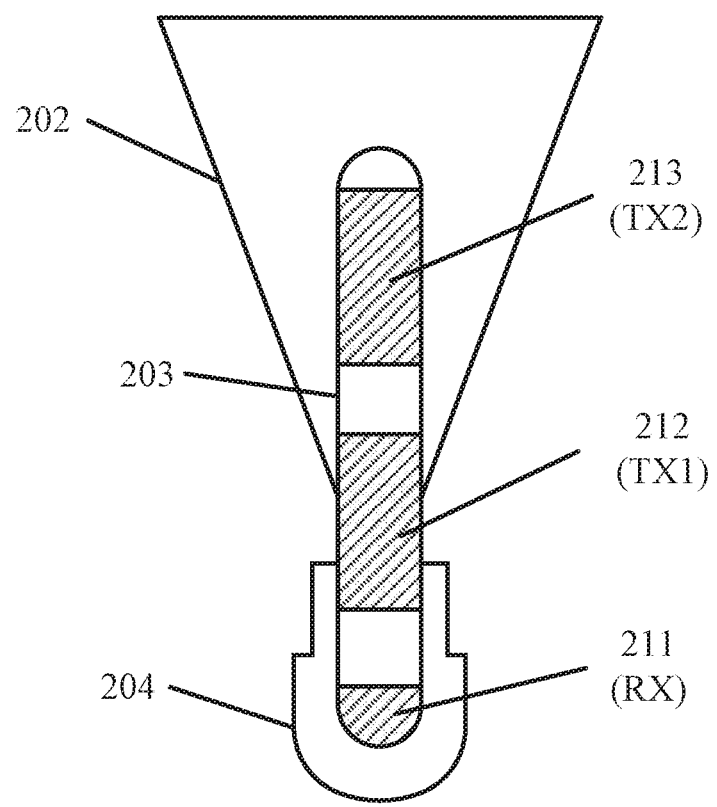
FIG. 3 is a schematic diagram showing an electrode deployment for a stylus in accordance with a first embodiment of the present disclosure.

FIG. 3 is a schematic diagram showing an electrode deployment for a stylus 20 in accordance with a first embodiment of the present disclosure. FIG. 3 is an enlargement of Portion A shown in FIG. 2. As shown in FIG. 3, a receiving (RX) electrode 211, a first emitting (TX1) electrode 212 and a second emitting (TX2) electrode 213 are disposed at the tip portion 203 of the stylus 20. These electrodes 211, 212 and 213 can be metal electrodes. The electrodes 211, 212 and 213 are spaced apart from each other and are separated by insulators. That is, basically, the electrodes 211, 212 and 213 are not electrically connected to each other.

Specifically, all of the receiving electrode 211, the first emitting electrode 212 and the second emitting electrode 213 are located at the tip portion 203. The receiving electrode 211 is located at a distal end of the tip portion 203 away from the cone portion 202. The first emitting electrode 212 is disposed at the tip portion 203 at a position closer to the cone portion 202 than the receiving electrode 211. The second emitting electrode 213 is disposed at the tip portion 203 at a position far away from the receiving electrode 211 with respect to the first emitting electrode 212. That is, the first emitting electrode 212 is disposed between the receiving electrode 211 and the second emitting electrode 213. Preferably, the second emitting electrode 213 is totally embedded into the cone portion 202, the first emitting electrode 212 is partially embedded into the cone portion 202 and the receiving electrode 211 exposes from the cone portion 202.

Specifically, the receiving electrode 211, the first emitting electrode 212 and the second emitting electrode 213 of the tip portion 203 are arranged along a straight line, following a lengthwise direction of the stylus 20. The electrodes 211, 212 and 213 are separated from each other by insulators. For example, a first insulator is located between the receiving electrode 211 and the first emitting electrode 212 and a second insulator is located between the first emitting electrode 212 and the second emitting electrode 213. The electrodes 211, 212 and 213 are spaced apart from each other along the straight line without overlap. Specifically, the projection of the electrodes 211, 212 and 213 on the straight line is not overlapped with each other.

The tip portion 203 can be fastened to the cone portion 202 of the stylus 20 by engaging, embedding, fastening with elastic sheets or adhering. The electrodes 211, 212 and 213 of the tip portion 203 can be electrically connected to the pen controller 201 inside the stylus 20 by elastic sheets or conductive wires. The pen controller 201 can control signal receiving performed using the receiving electrode 211 and signal transmitting performed using the first emitting electrode 212 and the second emitting electrode 213.

Referring to FIGS. 2 and 3, the touch pad 22 includes a plurality of driving lines (not shown) and a plurality of sensing lines (not shown) that are interlaced with each other. The touch pad 22 may also include a plurality of driving electrodes (not shown) and a plurality of sensing electrodes (not shown) that are located at the crossing points of the lines. By using the driving lines and the sensing lines, the touch pad 12 can send signals to the receiving electrode 211 of the stylus 20 and can also receive signals emitted from the first emitting electrode 212 and the second emitting electrode 213. The touch pad 22 and the electrodes 211, 212 and 213 on the stylus 20 are capacitively coupled to each other. By sensing capacitance changes for each coordinate on the touch pad 22, the touch controller 24 can obtain the position of the stylus 20 and the tilt angle of the stylus 10 with respect to the touch pad 22.

Specifically, the touch pad 22 emits a synchronous signal and the pen controller 200 of the stylus 20 can control the receiving electrode 211 to receive the synchronous signal. The first emitting electrode 212 and the second emitting electrode 213 of the stylus 20 emit signals by taking the synchronous signal received by the receiving electrode 211 as a time reference.

The first emitting electrode 212 of the stylus 20 emits a first signal based on the synchronous signal received by the receiving electrode 211. The first signal emitted by the first emitting electrode 212 causes capacitance changes for a certain range of areas on the touch pad 22. The touch controller 24 senses the capacitance changes (or detect an image constituted by capacitive values) so as to determine the coordinate (of the tip portion 203) of the stylus 20 on the touch pad 22.

The second emitting electrode 213 of the stylus 20 emits a second signal based on the synchronous signal received by the receiving electrode 211. The second signal emitted by the second emitting electrode 213 causes capacitance changes for a certain range of areas on the touch pad 22. The touch controller 24 senses the capacitance changes (or detect an image constituted by capacitive values) so as to determine the tilt angle of the stylus 20 with respect to the touch pad 22.

Since the first emitting electrode 212 is closer to the touch pad 22 than the second emitting electrode 213, using the signals emitted by the first emitting electrode 212 to determine the coordinate of the stylus 20 can obtain a relatively precise coordinate. In some examples, the obtained coordinate of the stylus 20 can also be used to calculate the tilt angle of the stylus 20 with respect to the touch pad 22.

The tilt angle of the stylus 20 can be used (1) to determine brush size in handwriting using the stylus 20, that is, the more the stylus 20 is tilted, the larger the brush size is, the brush size is presented as a line rather than a dot; and (2) to calibrate the coordinate of the stylus 20 on the touch pad 22, that is, the obtained coordinate may be deviated from an actual one when the stylus 20 is tilted, a precise coordinate can be obtained by use of the tilt angle of the stylus 20.

Compared to the conventional skills, the stylus 20 of the present disclosure has the following advantages: (1) The receiving electrode 211 of the stylus 20 is close to the touch pad 22. The synchronous signals emitted from the touch pad 22 and received by the receiving electrode 211 are large in amount, are well received and are not easy to be interfered by noise signals. (2) The receiving electrode 211 of the stylus 20 is disposed at pen tip and thus will not be easy to be covered or interfered by a finger to cause a bad connection. (3) The first emitting electrode 212 of the stylus 20 is disposed above the receiving electrode 211. The first emitting electrode 212 will not absorb the synchronous signal emitted by the touch pad 22 and thus the quality of synchronous signal received by the receiving electrode 211 is improved in a further step. (4) The receiving electrode 211, the first emitting electrode 212 and the second emitting electrode 213 of the stylus 20 are integrated into an individual assembly such that the assembling is simple. It is not easy to have errors in the assembling or increase the possibility of short circuits.

Figure 4:
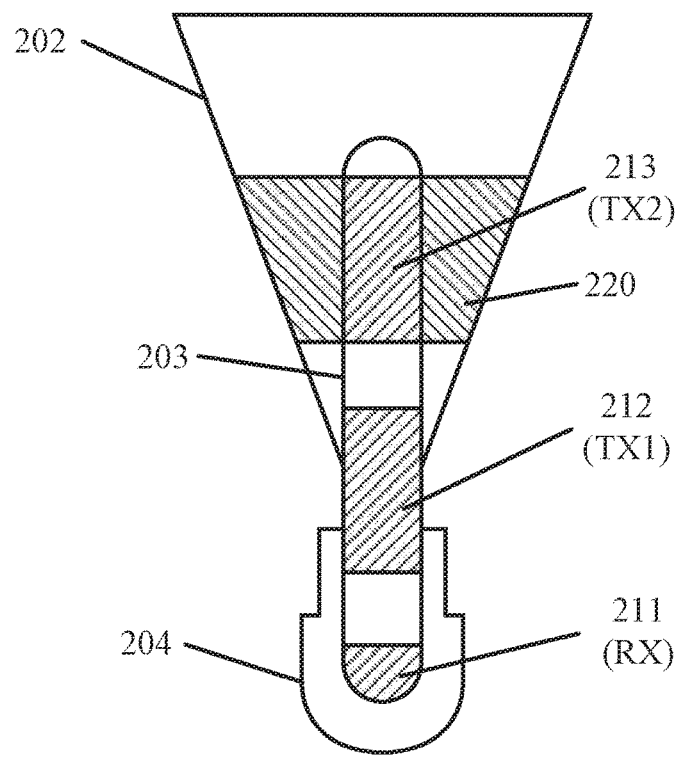
FIG. 4 is a schematic diagram showing an electrode deployment for a stylus in accordance with a second embodiment of the present disclosure.

FIG. 4 is a schematic diagram showing an electrode deployment for a stylus 20 in accordance with a second embodiment of the present disclosure. Compared to the first embodiment, in the second embodiment of the present disclosure, the cone portion 202 has a conductive portion 220 located at a position corresponding to the second emitting electrode 213 of the tip portion 203 and the conductive portion 220 of the cone portion 202 is electrically connected to the second emitting electrode 213 of the tip portion 203. In such a way, the electrical connection between the pen controller 200 and the second emitting electrode 213 can be achieved by the electrical connection between the pen controller 200 and the cone portion 220 of the cone portion 202. This simplifies layout complexity. Also, the second signal emitted by the second emitting electrode 213 will not be degenerated by insulating material located at the cone portion 202. Since the horizontal length of the conductive portion 220 is long, the capacitance change caused on the touch pad 22 is beneficial to measure the tilt angle of the stylus 20.

Figure 5:
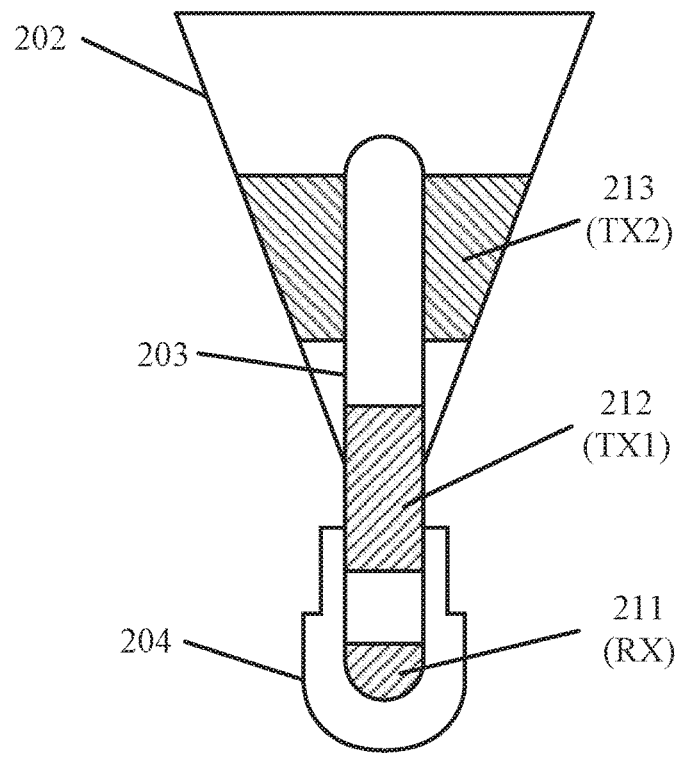
FIG. 5 is a schematic diagram showing an electrode deployment for a stylus in accordance with a third embodiment of the present disclosure.

FIG. 5 is a schematic diagram showing an electrode deployment for a stylus 20 in accordance with a third embodiment of the present disclosure. Compared to the first embodiment, in the second embodiment of the present disclosure, the second emitting electrode 213 is directly disposed at the cone portion 202 (at a position corresponding to the conductive portion 220 of the second embodiment), rather than disposed at the tip portion 203. The second emitting electrode 213 of the cone portion 202 is disposed at the cone portion 202 at a position far away from the receiving electrode 211 with respect to the first emitting electrode 212. In such a way, the pen controller 200 is electrically connected to the second emitting electrode 213 of the cone portion 202 directly. This simplifies layout complexity. Also, since the horizontal length of the second emitting electrode 213 of the cone portion 202 is long, this is beneficial to measure the tilt angle of the stylus 20.

Figure 6A:
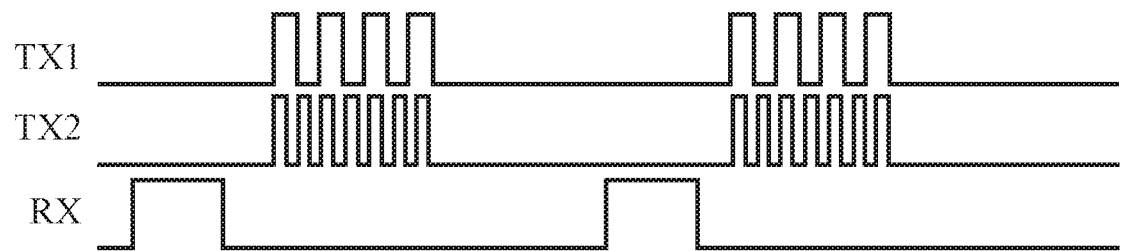
FIG. 6A is a diagram showing the timing of signals provided on electrodes on a stylus according to an example of the present disclosure.

FIG. 6A is a diagram showing the timing of signals provided on electrodes on a stylus 20 according to an example of the present disclosure. As described above, the first emitting electrode 212 and the second emitting electrode 213 of the stylus 20 emit signals by taking the synchronous signal received by the receiving electrode 211 as a time reference. In this example, after the receiving electrode 211 receives the synchronous signal (corresponding to RX), the first emitting electrode 212 and the second emitting electrode 213 emit signals at the same time. That is, the first signal (corresponding to TX1) from the first emitting electrode 212 and the second signal (corresponding to TX2) from the second emitting electrode 213 are emitted at the same time; however, the first signal and the second signal are different from each other by frequency. By analyzing the frequency of received signals, the touch pad 22 (or the touch controller 24) can differentiate which signal is emitted by which electrode (212 or 213).

Figure 6B:
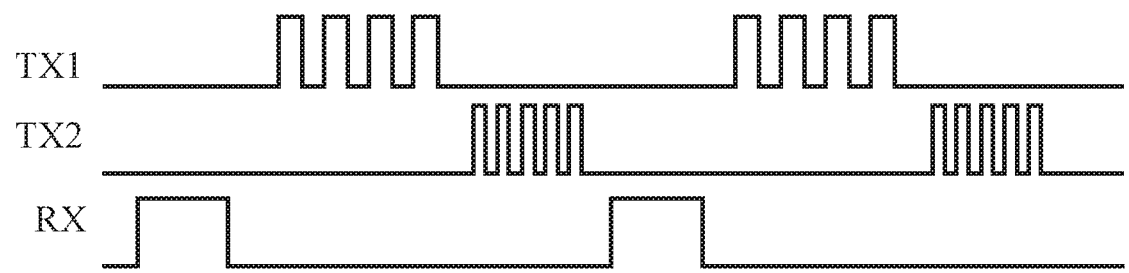
FIG. 6B is a diagram showing the timing of signals provided on electrodes on a stylus according to another example of the present disclosure.

FIG. 6B is a diagram showing the timing of signals provided on electrodes on a stylus 20 according to another example of the present disclosure. In this example, after the receiving electrode 211 receives the synchronous signal (corresponding to RX), the first emitting electrode 212 and the second emitting electrode 213 emit signals at different time points. That is, the first signal (corresponding to TX1) from the first emitting electrode 212 and the second signal (corresponding to TX2) from the second emitting electrode 213 are emitted at different time points and the first signal and the second signal are different from each other by frequency. By analyzing the frequency of received signals or distinguishing the time points the signals are received, the touch pad 22 (or the touch controller 24) can differentiate which signal is emitted by which electrode (212 or 213).

Figure 6C:
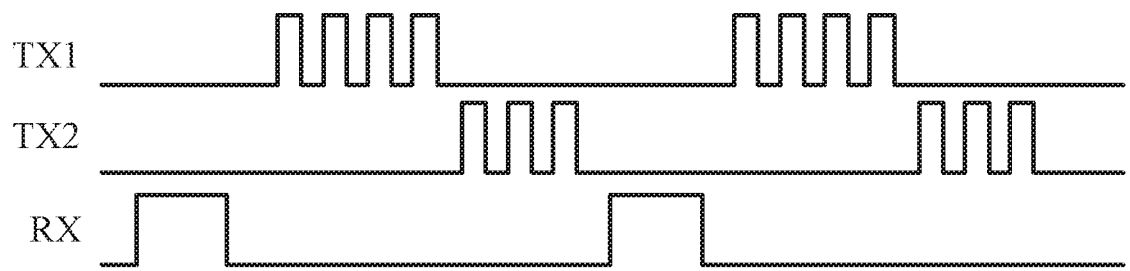
FIG. 6C is a diagram showing the timing of signals provided on electrodes on a stylus according to still another example of the present disclosure.

FIG. 6C is a diagram showing the timing of signals provided on electrodes on a stylus 20 according to still another example of the present disclosure. In this example, after the receiving electrode 211 receives the synchronous signal (corresponding to RX), the first emitting electrode 212 and the second emitting electrode 213 emit signals at different time points. That is, the first signal (corresponding to TX1) from the first emitting electrode 212 and the second signal (corresponding to TX2) from the second emitting electrode 213 are emitted at different time points; however, the first signal and the second signal are of a same frequency. By distinguishing the time points the signals are received, the touch pad 22 (or the touch controller 24) can differentiate which signal is emitted by which electrode (212 or 213).

Figure 7:
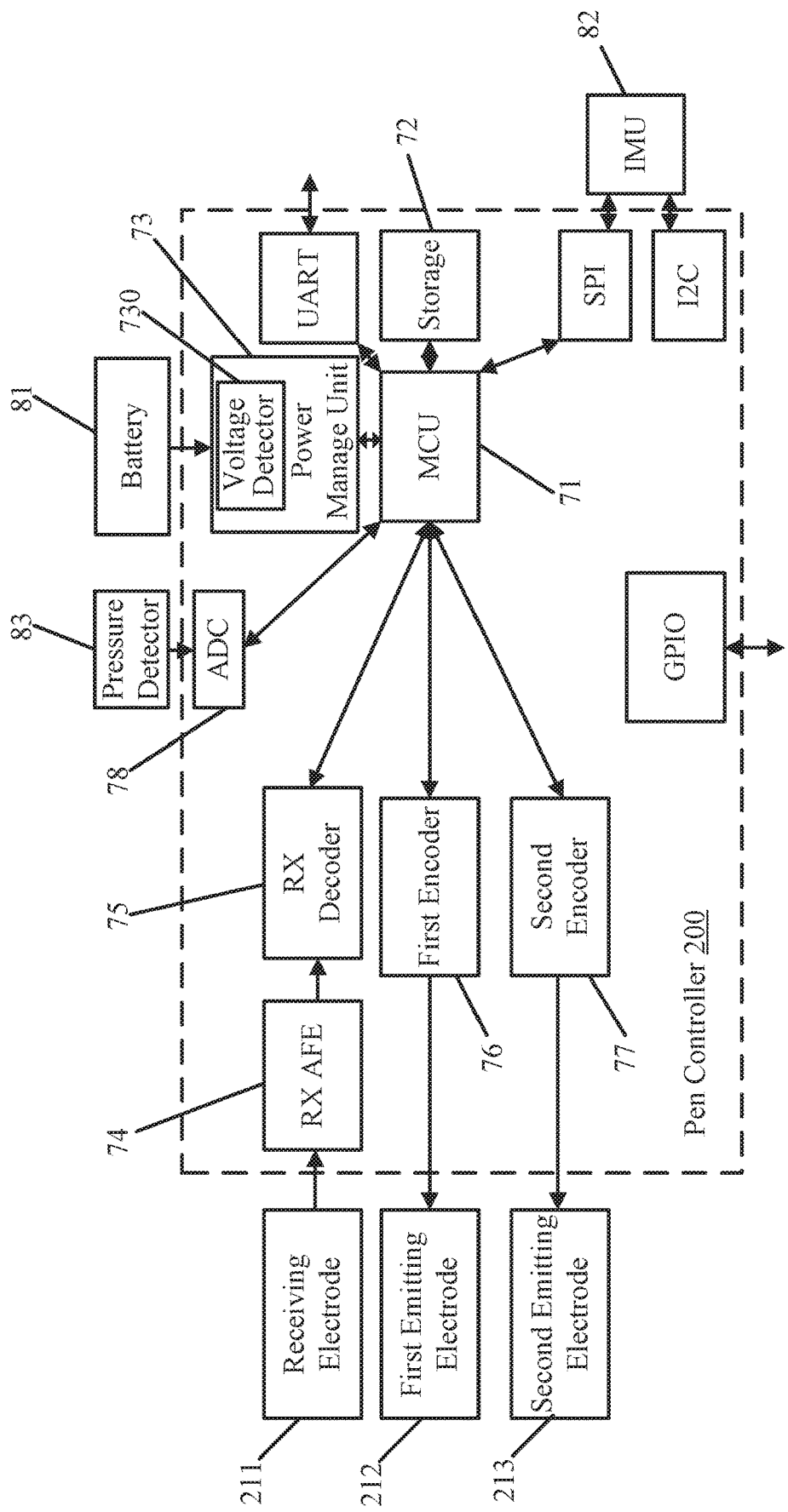
FIG. 7 is a diagram showing a hardware framework of a stylus according to the present disclosure.

FIG. 7 is a diagram showing a hardware framework of a stylus 20 according to the present disclosure. As shown in FIG. 7, the stylus 20 includes a pen controller 200, which can be implemented by an application-specific integrated circuit (ASIC). The pen controller 200 includes a micro control unit (MCU) 71 and a storage 72. The storage 72 stores a plurality of instructions executable by the MCU 71. The storage 72 can be a volatile or non-volatile storage, or have both of a volatile storage and a non-volatile storage. The pen controller 200 further includes a power manage unit 73 configured to manage power supply. The power manage unit 73 has a voltage detector 730, which can detect whether a battery 81 is connected or not. When the battery 81 is detected to be at low potential, a user is informed to use a new battery to replace the battery 81 or recharge the battery 81. The battery 81 can be a alkaline battery, a rechargeable Li battery or a rechargeable super capacitor battery.

The MCU 71 is connected to a RX analog front-end (AFE) 74 and a RX decoder 75. The synchronous signal received by the receiving electrode 211 is processed and decoded using the TX AFE 74 and the RX decoder 75 and then transmitted to the MCU 71. The MCU 71 is also connected to a first encoder 76 for encoding the first signal and then the encoded first signal is emitted by the first emitting electrode 212. The MCU 71 is also connected to a second encoder 77 for encoding the second signal and then the encoded second signal is emitted by the second emitting electrode 213.

The pen controller 200 further includes a plurality of transmission interfaces, for example, UART, GPIO, SPI and I2C. The pen controller 200 can be connected to an inertial measurement unit (IMU) 82 by SPI and I2C interfaces. The IMU 82 can be a 9-axes sensor. The pen controller 200 may also have a pressure detector 83, which can be connected to the MCU 71 via an analog-to-digital converter (ADC) 78 of the pen controller 200. The pressure detector 83 is configured to measure the pressure of a pen tip.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

The invention claimed is:

1. A bidirectional active pen, comprising:
a body;
a cone portion, having a bottom part and a top part, the bottom part of the cone portion having a cross-sectional area greater than that of the top part, the bottom part of the cone portion connecting to the body; and
a tip portion, connected to the top part of the cone portion, wherein the tip portion comprises:
a receiving electrode, located at a distal end of the tip portion away from the cone portion, configured to receive a synchronous signal coming from outside of the stylus, wherein the receiving electrode can only be used to receive signals at any time;
a first emitting electrode, disposed at the tip portion at a position closer to the cone portion than the receiving electrode, configured to emit a first signal based on the synchronous signal received by the receiving electrode, the first signal provided to calculate a coordinate of the tip portion; and
a second emitting electrode, disposed at the tip portion at a position far away from the receiving electrode with respect to the first emitting electrode, configured to emit a second signal based on the synchronous signal received by the receiving electrode, the second signal provided to calculate a tilt angle of the stylus,
wherein the cone portion has a slot formed inside, the slot has an opening formed at the top part, a part of the tip portion is received in the slot, another part of the tip portion exposes from the opening,
wherein all of the receiving electrode, the first emitting electrode and the second emitting electrode are located at the tip portion,
wherein the second emitting electrode is totally embedded into the cone portion, the first emitting electrode is partially embedded into the cone portion and the receiving electrode exposes from the cone portion.

2. The stylus according to claim 1, wherein the first emitting electrode is disposed between the receiving electrode and the second emitting electrode.

3. The stylus according to claim 1, wherein the receiving electrode, the first emitting electrode and the second emitting electrode of the tip portion are arranged along a straight line along a lengthwise direction of the stylus, and are spaced apart from each other on the straight line without overlap.

4. The stylus according to claim 1, wherein the cone portion has a conductive portion at a position corresponding to the second emitting electrode, and the conductive portion of the cone portion and the second emitting electrode of the tip portion are electrically connected to each other.

5. The stylus according to claim 1, wherein the first signal emitted by the first emitting electrode and the second signal emitted by the second emitting electrode are different in frequency but are emitted at the same time in response to the synchronous signal received by the receiving electrode.

6. The stylus according to claim 1, wherein the first signal emitted by the first emitting electrode and the second signal emitted by the second emitting electrode are different in frequency and are emitted at different time points in response to the synchronous signal received by the receiving electrode.

7. The stylus according to claim 1, wherein the first signal emitted by the first emitting electrode and the second signal emitted by the second emitting electrode have a same frequency but are emitted at different time points in response to the synchronous signal received by the receiving electrode.

8. A bidirectional active pen, comprising:
a body;

a cone portion, having a bottom part and a top part, the bottom part of the cone portion having a cross-sectional area greater than that of the top part, the bottom part of the cone portion connecting to the body; and a tip portion, connected to the top part of the cone portion, wherein the tip portion comprises:

a receiving electrode, located at a distal end of the tip portion away from the cone portion, configured to receive a synchronous signal coming from outside of the stylus, wherein the receiving electrode can only be used to receive signals at any time; and a first emitting electrode, disposed at the tip portion at a position closer to the cone portion than the receiving electrode, configured to emit a first signal based on the synchronous signal received by the receiving electrode, the first signal provided to calculate a coordinate of the tip portion, wherein the cone portion comprises:

a second emitting electrode, disposed at the cone portion at a position far away from the receiving electrode with respect to the first emitting electrode, configured to emit a second signal based on the synchronous signal received by the receiving electrode, the second signal provided to calculate a tilt angle of the stylus, wherein the cone portion has a slot formed inside, the slot has an opening formed at the top part, a part of the tip portion is received in the slot, another part of the tip portion exposes from the opening, wherein both the receiving electrode and the first emitting electrode are located at the tip portion, wherein the first emitting electrode is partially embedded into the cone portion and the receiving electrode exposes from the cone portion.

9. The stylus according to claim 8, wherein the first emitting electrode is disposed between the receiving electrode and the second emitting electrode.

10. The stylus according to claim 8, wherein the receiving electrode and the first emitting electrode of the tip portion and the second emitting electrode of the cone portion are arranged along a straight line along a lengthwise direction of the stylus, and are spaced apart from each other on the straight line without overlap.

11. The stylus according to claim 8, wherein the first signal emitted by the first emitting electrode and the second signal emitted by the second emitting electrode are different in frequency but are emitted at the same time in response to the synchronous signal received by the receiving electrode.

12. The stylus according to claim 8, wherein the first signal emitted by the first emitting electrode and the second signal emitted by the second emitting electrode are different in frequency and are emitted at different time points in response to the synchronous signal received by the receiving electrode.

13. The stylus according to claim 8, wherein the first signal emitted by the first emitting electrode and the second signal emitted by the second emitting electrode have a same frequency but are emitted at different time points in response to the synchronous signal received by the receiving electrode.

14. A sensing system, comprising:

a touch pad; and a bidirectional active stylus, movably contacting the touch pad, wherein the stylus comprises:

a body;

a cone portion, having a bottom part and a top part, the bottom part of the cone portion having a cross-sectional area greater than that of the top part, the bottom part of the cone portion connecting to the body; and a tip portion, connected to the top part of the cone portion, wherein the tip portion comprises:

a receiving electrode, located at a distal end of the tip portion away from the cone portion, configured to receive a synchronous signal from touch pad, wherein the receiving electrode can only be used to receive signals at any time;

a first emitting electrode, disposed at the tip portion at a position closer to the cone portion than the receiving electrode, configured to emit a first signal based on the synchronous signal received by the receiving electrode, the touch pad sensing the first signal to obtain a coordinate of the tip portion of the stylus on the touch pad; and a second emitting electrode, disposed at the tip portion at a position far away from the receiving electrode with respect to the first emitting electrode, configured to emit a second signal based on the synchronous signal received by the receiving electrode, the touch pad sensing the second signal to obtain a tilt angle of the stylus with respect to the touch pad, wherein the cone portion has a slot formed inside, the slot has an opening formed at the top part, a part of the tip portion is received in the slot, another part of the tip portion exposes from the opening, wherein all of the receiving electrode, the first emitting electrode and the second emitting electrode are located at the tip portion, wherein the second emitting electrode is totally embedded into the cone portion, the first emitting electrode is partially embedded into the cone portion and the receiving electrode exposes from the cone portion.

* * * * *